US009577456B2

(12) United States Patent  
Takemura et al.

(10) Patent No.: US 9,577,456 B2  
(45) Date of Patent: Feb. 21, 2017

(54) BATTERY DEVICE, CONTROL METHOD, AND ELECTRIC VEHICLE

(75) Inventors: Kazuyoshi Takemura, Tokyo (JP); Takanori Washiro, Kanagawa (JP); Isao Soma, Saitama (JP)

(73) Assignee: SONY CORPORATION, Tokyo (JP)

( * ) Notice: Subject to any disclaimer, the term of this patent is extended or adjusted under 35 U.S.C. 154(b) by 520 days.

(21) Appl. No.: 14/122,129

(22) PCT Filed: May 22, 2012

(86) PCT No.: PCT/JP2012/063033  
§ 371 (c)(1),  
(2), (4) Date: Nov. 25, 2013

(87) PCT Pub. No.: WO2012/165220  
PCT Pub. Date: Dec. 6, 2012

(65) Prior Publication Data  
US 2014/0097672 A1    Apr. 10, 2014

(30) Foreign Application Priority Data

May 31, 2011    (JP) .................................. 2011-122194

(51) Int. Cl.  
*H02J 3/02*      (2006.01)  
*H02J 7/00*      (2006.01)  
(Continued)

(52) U.S. Cl.  
CPC .......... *H02J 7/0063* (2013.01); *B60L 11/1816* (2013.01); *B60L 11/1846* (2013.01);  
(Continued)

(58) Field of Classification Search  
CPC ...... H01M 10/4257; H01M 2010/4278; Y02T 10/7072; Y02T 90/16; B62M 6/90;  
(Continued)

(56) References Cited

U.S. PATENT DOCUMENTS

2006/0261674 A1    11/2006  Unno  
2012/0146580 A1*    6/2012  Kitamura ................ H01F 38/14  
                                                  320/108

FOREIGN PATENT DOCUMENTS

JP        2000-142514        5/2000  
JP        2000-164185        6/2000  
(Continued)

*Primary Examiner* — Jared Fureman  
*Assistant Examiner* — Duc M Pham  
(74) *Attorney, Agent, or Firm* — CHIP Law Group

(57) ABSTRACT

This technology relates to a battery device, a control method, and an electric vehicle capable of providing a highly secure anti-theft function. A battery outputs DC power through a power line, a reader/writer communicates by outputting a high-frequency signal through the power line to read authentication information of an electronic device when the electronic device is connected to the battery through the power line, a microcomputer stores the read authentication information and controls the battery when first connection to the electronic device is performed, and performs an authentication process of the electronic device based on the read authentication information and the authentication information stored in the first connection and controls the battery according to a result of the authentication process of the electronic device when second or subsequent connection to the electronic device is performed. This technology may be applied to the battery device mounted on a power-assisted bicycle, for example.

8 Claims, 7 Drawing Sheets

(51) Int. Cl.
*H01M 10/42* (2006.01)
*H01M 10/44* (2006.01)
*B62M 6/90* (2010.01)
*B62H 5/00* (2006.01)
*B62H 5/20* (2006.01)
*B60L 11/18* (2006.01)
*B60R 16/033* (2006.01)
*B62M 6/45* (2010.01)
*B62M 6/75* (2010.01)

(52) U.S. Cl.
CPC ............. *B60R 16/033* (2013.01); *B62H 5/00* (2013.01); *B62H 5/20* (2013.01); *B62M 6/45* (2013.01); *B62M 6/75* (2013.01); *B62M 6/90* (2013.01); *H01M 10/4257* (2013.01); *H01M 10/44* (2013.01); *B60L 2200/12* (2013.01); *B60L 2200/34* (2013.01); *B60L 2200/46* (2013.01); *H01M 2010/4278* (2013.01); *H01M 2220/20* (2013.01); *H02J 7/0013* (2013.01); *H02J 2007/0001* (2013.01); *H04B 2203/5416* (2013.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01); *Y10T 307/766* (2015.04)

(58) Field of Classification Search
CPC .... B62H 5/00; B60L 11/1816; B60L 2200/12; H02J 2007/0001; H02J 7/0013; Y04S 30/14; H04B 2203/5416; Y10T 307/766
USPC .......................................................... 307/3
See application file for complete search history.

(56) References Cited

FOREIGN PATENT DOCUMENTS

| | | | | |
|---|---|---|---|---|
| JP | 2007045339 | * | 8/2005 | ............ B62M 23/02 |
| JP | 2006-321452 | | 11/2006 | |
| JP | 2008-260400 | | 10/2008 | |
| JP | 2009-248662 | | 10/2009 | |
| JP | 2011024293 | * | 2/2011 | ................ H02J 7/00 |

* cited by examiner

BATTERY CHARGING SYSTEM 2

BATTERY DEVICE, CONTROL METHOD, AND ELECTRIC VEHICLE

CROSS REFERENCES TO RELATED APPLICATIONS

The present application is a national stage of International Application No. PCT/JP2012/063033 filed on May 22, 2012 and claims priority to Japanese Patent Application No. 2011-122194 filed on May 31, 2011, the disclosure of which is incorporated herein by reference.

BACKGROUND

This technology relates to a battery device, a control method, and an electric vehicle, and especially relates to the battery device, the control method, and the electric vehicle capable of providing a highly secure anti-theft function.

Recently, a power-assisted bicycle becomes widely used (for example, refer to Patent Document 1).

It is supposed that the battery device mounted on the power-assisted bicycle is charged once every one-day to one-week use, so that this is designed to be easily attached/detached to/from a bicycle main body and carried for convenience. Therefore, only the battery device might be easily stolen.

CITATION LIST

Patent Document

Patent Document 1: JP 2008-260400 A

SUMMARY

Problems to be Solved by the Invention

The surest way to prevent the battery device from being stolen is to detach the battery device from the bicycle when getting away from the bicycle; however, it is necessary to carry the detached battery device while being out, so that this is not a realistic method.

Measures are taken in the conventional technology such that the battery device may also be locked using the same key as that of the bicycle main body; however, this is a physical key, so that theft by force such as by break of a key hole using a tool cannot be completely avoided at present. Therefore, more effective anti-theft measures are required.

This technology is achieved in view of such a condition and an object thereof is to provide the highly secure anti-theft function.

Solutions to Problems

A battery device according to one aspect of this technology is provided with a battery, which outputs DC power through a power line; a communication unit, which, when an electronic device is connected to the battery through the power line, communicates by outputting a high-frequency signal through the power line to read authentication information of the electronic device; and a control unit, which stores the read authentication information and controls the battery when first connection to the electronic device is performed, wherein the control unit performs an authentication process of the electronic device based on the read authentication information and the authentication information stored in the first connection and controls the battery according to a result of the authentication process of the electronic device when second or subsequent connection to the electronic device is performed.

The electronic device is a power supply device, which supplies the DC power to a drive device for generating electric driving force, in a power-assisted bicycle, which generates auxiliary electric driving force in addition to human driving force to travel forward, and the control unit controls the DC power output from the battery to the power supply device through the power line.

The power supply device is provided with a storage element, which outputs the stored authentication information to the battery device through the power line by performing load modulation of the high-frequency signal input through the power line.

The electronic device is a charging device for charging the battery, and the control unit controls the DC power output from the charging device to the battery through the power line.

The charging device is provided with a storage element, which outputs the stored authentication information to the battery device through the power line by performing load modulation of the high-frequency signal input through the power line.

A storage unit, which stores history information about authentication history and use history of the battery device, is further provided, and the communication unit communicates by outputting the high-frequency signal through the power line to transmit the stored history information to the charging device.

The battery device may be an independent device or an internal block composing one device.

A control method or an electric vehicle according to one aspect of this technology is the control method or the electric vehicle corresponding to the above-described battery device according to one aspect of this technology.

In the battery device, the control method, and the electric vehicle according to one aspect of this technology, when the electronic device is connected to the battery through the power line, the authentication information of the electronic device is read by communicating by outputting the high-frequency signal through the power line, the read authentication information is stored and the battery is controlled when the first connection to the electronic device is performed, and the authentication process of the electronic device based on the read authentication information and the authentication information stored in the first connection is performed and the battery is controlled according to the result of the authentication process of the electronic device when the second or subsequent connection to the electronic device is performed.

Effects of the Invention

According to one aspect of this technology, it is possible to provide a highly secure anti-theft function.

Additional features and advantages are described herein, and will be apparent from the following Detailed Description and the figures.

DETAILED DESCRIPTION

Embodiments of this technology are hereinafter described with reference to the drawings.

1. First Embodiment

Configuration Example of Power-Assisted Bicycle

Figure 1:
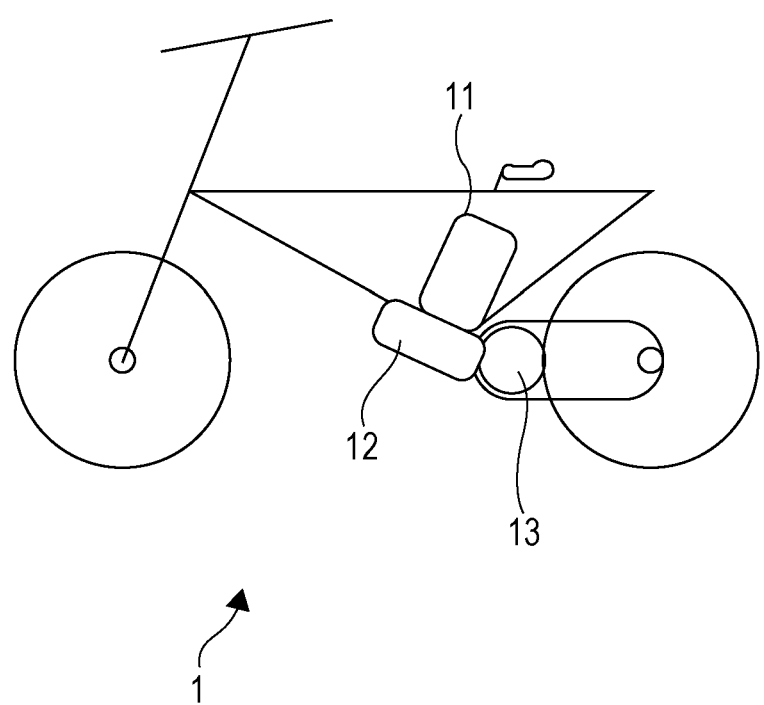
FIG. 1 is a configuration example of a power-assisted bicycle.

FIG. 1 is a view illustrating a configuration example of power-assisted bicycle.

A power-assisted bicycle 1 is a bicycle, which generated auxiliary electric driving force in addition to human driving force to travel forward.

As illustrated in FIG. 1, a principal framework of the power-assisted bicycle 1 is composed of a body frame made of a metallic pipe to which a front wheel, a rear wheel, a handlebar, a saddle, a pedal and the like are attached. The frame is provided with a frame device 12 for supplying a drive device 13 with power from a battery device 11, and the rear wheel is rotated by tread force applied to the pedal transmitted to the drive device 13 through a control circuit (not illustrated) and the like. As a result, it becomes possible to allow the power-assisted bicycle 1 to travel forward.

Meanwhile, the frame device 12 has a shape on which the battery device 11 may be mounted and is provided with a power supply terminal (contact 31 in FIG. 2) in a position corresponding to a power supply terminal (contact 24 in FIG. 2) of the battery device 11 to be electrically connectable to the battery device 11 mounted thereon. Therefore, the battery device 11 detachably mounted on the frame device 12 may be removed at the time of charge, for example.

The power-assisted bicycle 1 is configured as described above.

[Detailed Configuration Example of Each Device]

Figure 2:
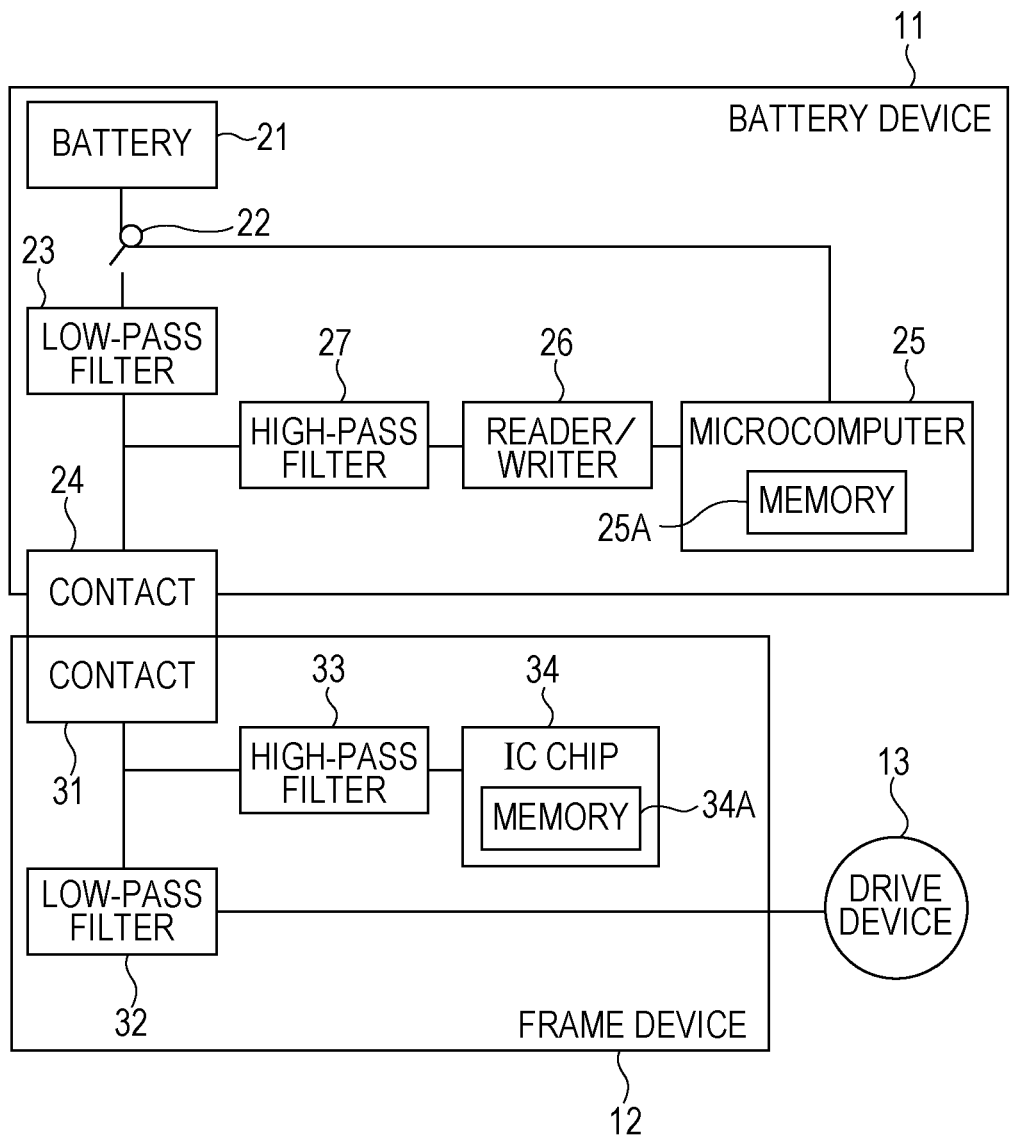
FIG. 2 is a view illustrating a detailed configuration example of each device of the power-assisted bicycle in FIG. 1.

FIG. 2 is a view illustrating a detailed configuration of the battery device 11, the frame device 12, and the drive device 13 in FIG. 1. Meanwhile, FIG. 2 illustrates a state in which the battery device 11 is mounted on the frame device 12 and the contacts of both of them are electrically connected to each other.

As illustrated in FIG. 2, the battery device 11 is composed of a battery 21, a switch 22, a low-pass filter 23, the contact 24, a microcomputer 25, a reader/writer 26, and a high-pass filter 27.

The battery 21 has one or more battery cells and a control circuit embedded therein and outputs DC voltage/direct current, that is to say, DC power through a power line.

The switch 22 is arranged on the power line between the battery 21 and the low-pass filter 23 to perform switching operation according to control of the microcomputer 25. That is to say, the DC power from the battery 21 is supplied to the low-pass filter 23 through the power line when the switch 22 is turned on (energized state). On the other hand, when the switch 22 is turned off (shut-down state), the low-pass filter 23 is not supplied with the DC power.

The low-pass filter 23 is arranged on the power line between the battery 21 and the contact 24 to enable the frame device 12 connected thereto through the contact 24 to be supplied with the DC power. The low-pass filter 23 blocks a high-frequency signal generated by the reader/writer 26 to be transmitted through the power line.

The microcomputer 25 controls the switch 22 and the reader/writer 26. The microcomputer 25 has a memory 25A and may store various pieces of information.

The reader/writer 26 communicates with the frame device 12 connected thereto through the contact 24 according to the control of the microcomputer 25.

Specifically, the reader/writer 26 normally serves to electromagnetically couple to an IC chip to transfer the high-frequency signal to and from the IC chip. That is to say, the reader/writer 26 is provided for writing and reading information in conformity to an IC chip standard. However, in this embodiment, the high-frequency signal (AC signal) is transferred through the power line. That is to say, the high-frequency signal normally transferred by a coil and the like in the reader/writer 26 is superimposed on the power line through the high-pass filter 27 and the communication with the IC chip is performed through the power line.

The high-pass filter 27 allows the high-frequency signal generated by the reader/writer 26 to pass therethrough to be transmitted to the frame device 12 through the power line. A high-pass filter 33 blocks the DC power transmitted through the power line.

The battery device 11 is configured as described above and supplies the DC power to the frame device 12.

As illustrated in FIG. 2, the frame device 12 is composed of the contact 31, a low-pass filter 32, the high-pass filter 33, and an IC chip 34.

The low-pass filter 32 is arranged on the power line between the contact 31 and the drive device 13 to enable the drive device 13 to be supplied with the DC power supplied from the battery device 11 connected thereto through the contact 31. The low-pass filter 32 blocks the high-frequency signal generated by the reader/writer 26 of the battery device 11 to be transmitted through the power line.

The high-pass filter 33 allows the high-frequency signal generated by the reader/writer 26 of the battery device 11 to pass therethrough to be transmitted to the IC chip 34 through the power line. The high-pass filter 33 blocks the DC power supplied through the power line.

The IC chip 34 performs a process according to a command corresponding to the high-frequency signal transmitted from the reader/writer 26 by power obtained by the high-frequency signal superimposed on the power line. The IC chip 34 transmits a processing result to the reader/writer 26 through the power line by performing load modulation thereof.

The IC chip 34, which is a storage element having a memory 34A, may store the information transmitted from the reader/writer 26 and the processing result.

Meanwhile, the IC chip 34 may be composed of an electronic tag such as an IC tag conforming to various standards. For example, as well as the electronic tag meeting the standards such as FeliCa™, NFC (near field communication)™, RFID (radio frequency identification)™, and Mifare™, that having a unique configuration, which do not conform to the standards, may also be prepared. The IC chip 34 at least serves to read and output the information stored therein by the high-frequency signal and preferably serves to store supplied information. Any of a passive type and an active type may be used.

The frame device 12 is configured as described above to supply the DC power from the battery device 11 to the drive device 13.

[Flow of Authenticated Connection Process]

Next, an authenticated connection process performed between the battery device 11 and the frame device 12 is described with reference to a flowchart in FIG. 3.

When the battery device 11 is mounted on the frame device 12 and the battery device 11 and the frame device 12 are electrically connected to each other ("Yes" at step S11), the authenticated connection process is started.

At step S12, the microcomputer 25 generates a command to read authentication information. Specifically, the authentication information for uniquely identifying the frame device 12 is stored in the memory 34A of the IC chip 34 of the frame device 12 and the command to read the same is generated.

At step S13, the reader/writer 26 modulates the high-frequency signal as the high-frequency signal in response to the command. Specifically, the reader/writer 26 performs amplitude modulation of a carrier wave at a frequency of 13.56 MHz as the high-frequency signal in response to the command generated at step S12. At step S14, the reader/writer 26 outputs the high-frequency signal through the power line.

The high-frequency signal output from the battery device 11 is transmitted to the frame device 12 through the power line. In the frame device 12, the IC chip 34 receives the high-frequency signal transmitted through the power line (step S31).

At step S32, the IC chip 34 executes the command to read the authentication information using the power obtained from the high-frequency signal to read the authentication information of the frame device 12 stored in the memory 34A (step S33). At step S34, the IC chip 34 performs the load modulation in response to the read authentication information.

A signal of a reflecting wave generated by the load modulation of the high-frequency signal in the IC chip 34 is received by the battery device 11 through the power line. In the battery device 11, the reader/writer 26 demodulates the signal of the reflecting wave generated by the load modulation (step S15). By this, the authentication information is read from the frame device 12.

At step S16, the microcomputer 25 determines whether the connection to the frame device 12 is first connection. When the connection is determined to be the first connection at step S16, such as when the authentication information of the frame device 12 is not stored in the memory 25A, for example, the process shifts to step S17.

At step S17, the microcomputer 25 stores the authentication information read from the frame device 12 in the memory 25A. By this, the battery device 11 stores the authentication information of the frame device 12 on which this should be mounted.

At step S18, the microcomputer 25 reads authentication information for uniquely identifying the battery device 11 stored in the memory 25A. At step S19, the reader/writer 26 modulates the high-frequency signal in response to the read authentication information and outputs the high-frequency signal through the power line (step S20).

The high-frequency signal output from the battery device 11 is transmitted to the frame device 12 through the power line. In the frame device 12, the IC chip 34 received the high-frequency signal transmitted through the power line (step S35) and stores the authentication information obtained from the high-frequency signal in the memory 34A (step S36). That is to say, not only the battery device 11 but also the frame device 12 holds the authentication information of the device to be connected thereto.

In the first connection, the DC power from the battery 21 is supplied to the frame device 12 through the power line and the drive device 13 is driven by this.

On the other hand, when it is determined that the connection is not the first connection, that is to say, this is second or subsequent connection at step S16, the process shifts to step S21. At step S21, the microcomputer 25 checks the authentication information read from the frame device 12 against the authentication information stored in the memory 25A in the first connection to perform an authentication process.

At step S22, the microcomputer 25 determines whether the authentication information read from the frame device 12 is valid authentication information based on a result of the check at step S21. When this is determined to be the valid authentication information at step S22, the process shifts to step S23.

At step S23, the microcomputer 25 controls the switch 22 to perform a process of the valid authentication information. In the process of the valid authentication information, for example, the switch 22 is turned on and the battery 21 is controlled, the DC power from the battery 21 is supplied to the frame device 12 through the power line, and the drive device 13 is driven by this.

At step S24, the microcomputer 25 stores a result of the authentication process in the memory 25A. At step S26, the reader/writer 26 modulates the high-frequency signal in response to the result of the authentication process and outputs the high-frequency signal through the power line (step S20). By this, in the frame device 12, the result of the authentication process is stored in the memory 34A of the IC chip 34.

On the other hand, when the authentication information is determined to be invalid at step S22, the process shifts to step S25.

At step S25, the microcomputer 25 controls the switch 22 to perform a process of the invalid authentication information. In the process of the invalid authentication information, for example, the switch 22 is turned off and the battery 21 is controlled, and the DC power from the battery 21 is not supplied to the frame device 12, so that the drive device 13 cannot be driven. That is to say, the drive device 13 is driven only by the battery device 11 and the frame device 12 property combined.

In a case of the invalid authentication information also, the processes at steps S24, S26, and S20 are performed, the high-frequency signal corresponding to the result of the authentication process is output as in the case of the valid authentication information described above, and the result of the authentication process is stored in the memory 34A of the IC chip 34. By this, the authentication information of the battery device 11 and the result of the authentication process are stored in the memory 34A, so that, when this is connected to the battery device 11 next time, the information may be used in the authentication process and the like, for example.

As described above, in the authenticated connection process, when the first connection to the frame device 12 is performed by the battery device 11, the authentication information read from the frame device 12 is stored. When the second or subsequent connection to the frame device 12 is performed, the authentication process based on the authentication information read from the frame device 12 and the authentication information stored in the first connection is performed and the battery 12 is controlled according to the result of the authentication process.

That is to say, the battery device 11 stores the authentication information of the frame device 12 on which this is mounted at the beginning of use and supplies the power only to the frame device 12, which holds the authentication information. Therefore, even if the battery device 11 is stolen, for example, the battery device 11 cannot be used with the frame device other than the frame device 12 on which this is first mounted, so that a more secure anti-theft function may be provided. It is also possible to provide conventional anti-theft measures using a physical key in addition to this anti-theft function.

2. Second Embodiment

It is supposed that a battery device 11 is charged once every one-day to one-week use, for example, as described above, it is required to detach the same from a frame device 12 to charge depending on frequency of use of a power-assisted bicycle 1. A battery charging system for charging the battery device 11 is next described.

[Configuration Example of Battery Charging System]

Figure 4:
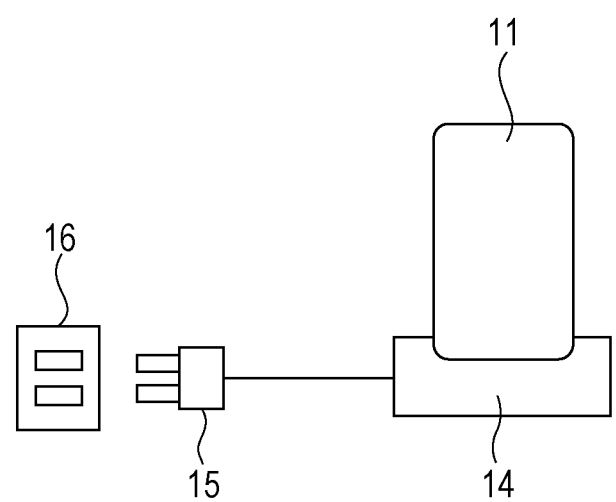
FIG. 4 is a view illustrating a configuration example of a battery charging system.

As illustrated in FIG. 4, a battery charging system 2 is composed of the battery device 11 and a charging device 14, which charges the battery device 11.

An AC plug 15 of the charging device 14 is connected to a household outlet 16, so that the charging device 14 may use AC power supply through the AC plug 15. The charging device 14 has a shape on which the battery device 11 may be put and is provided with a power supply terminal (contact 43 in FIG. 5) in a position corresponding to a power supply terminal (contact 24 in FIG. 5) of the battery device 11 to be electrically connectable to the battery device 11 put thereon.

The charging device 14 generates DC power for charging the battery device 11 from AC power supplied from the AC plug 15 and supplies the same to the battery device 11 put thereon. According to this, the battery device 11 is charged.

The battery charging system 2 is configured as described above.

[Detailed Configuration Example of Each Device]

Figure 5:
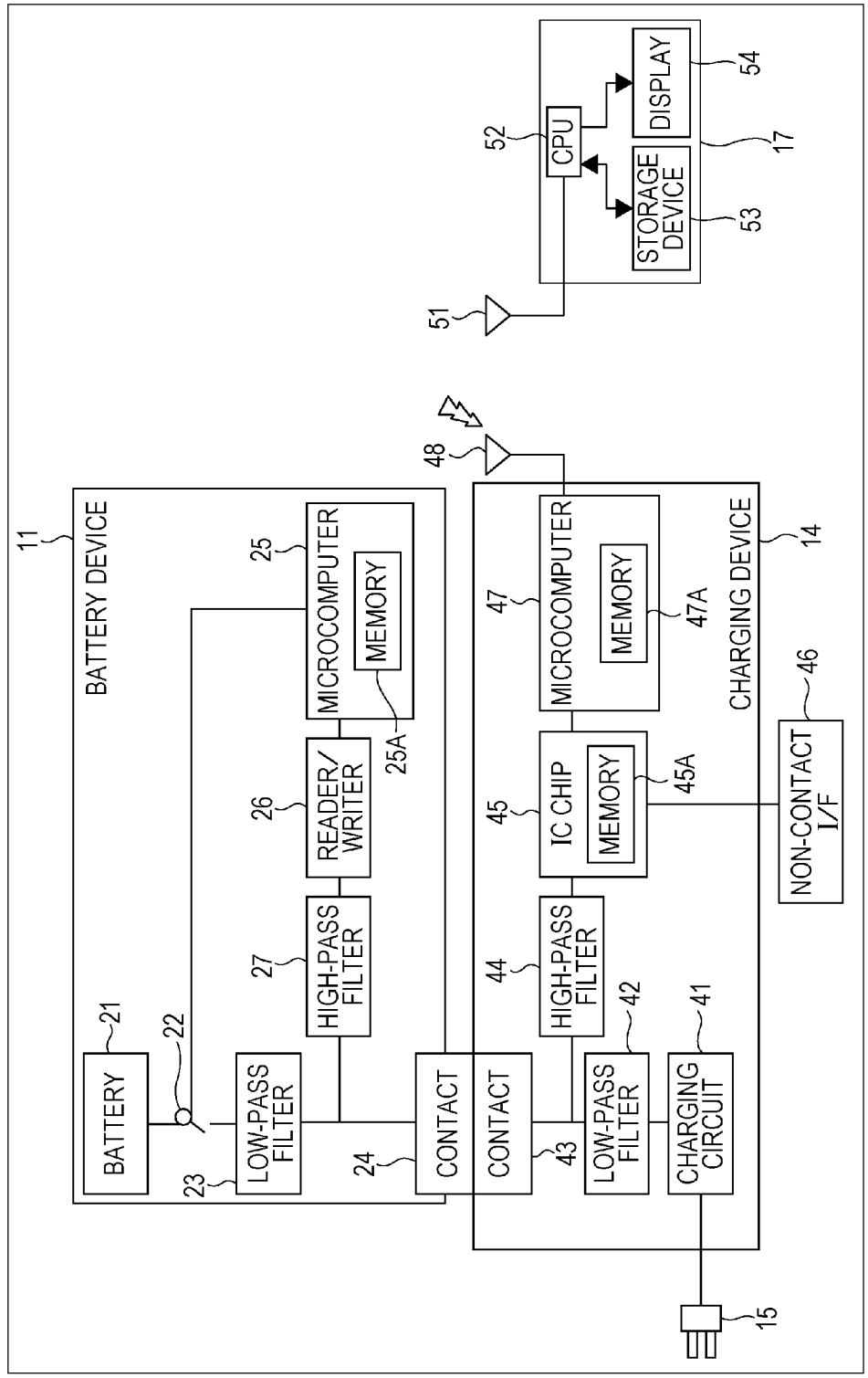
FIG. 5 is a view illustrating a detailed configuration example of each device of the battery charging system in FIG. 4.

FIG. 5 is a view illustrating a detailed configuration of the battery device 11 and the charging device 14 in FIG. 4. Meanwhile, FIG. 5 illustrates a state in which the battery device 11 is put on the charging device 14 and the contacts of both of them are electrically connected to each other.

In FIG. 5, the battery device 11 has a configuration similar to that of the battery device 11 in FIG. 2, so that the description thereof is omitted. FIG. 5 illustrates a management server 17, which manages information about authentication history and use history of the battery device 11 (hereinafter, referred to as history information).

As illustrated in FIG. 5, the charging device 14 is composed of a charging circuit 41, a low-pas filter 42, the contact 43, a high-pass filter 44, an IC chip 45, a non-contact I/F 46, a microcomputer 47, and a communication circuit 48.

The charging circuit 41 generates the DC power for charging the battery device 11 from the AC power supplied from the AC plug 15 and supplies the same to the battery device 11 through a power line.

The low-pass filter 42 is arranged on the power line between the charging circuit 41 and the contact 43 to enable the battery 21 of the battery device 11 connected thereto through the contact 43 to be supplied with the DC power from the charging circuit 41. The low-pass filter 42 blocks a high-frequency signal generated by a reader/writer 26 of the battery device 11 to be transmitted through the power line.

The high-pass filter 44 allows the high-frequency signal generated by the reader/writer 26 of the battery device 11 to pass therethrough to be transmitted to the IC chip 45 through the power line. The high-pass filter 44 blocks the DC power supplied through the power line.

The IC chip 45 performs a process according to a command corresponding to the high-frequency signal transmitted from the reader/writer 26 by power obtained by the high-frequency signal superimposed on the power line. The IC chip 45 transmits a processing result to the reader/writer 26 through the power line by performing load modulation thereof.

The IC chip 45, which is a storage element having a memory 45A, may store information transmitted from the reader/writer 26 and the processing result. The IC chip 45 has the non-contact I/F 46 conforming to a standard such as FeliCa™ and may transmit the information stored in the memory 45A by performing proximity communication with an electronic device in which an IC chip conforming to the standard is embedded.

The microcomputer 47 controls the IC chip 45 and the communication circuit 48. The microcomputer 47 has a memory 47A and may store various pieces of information.

The communication circuit 48 communicates with the management server 17 through a predetermined network according to the control of the microcomputer 47.

The charging device 14 is configured as described above and supplies the DC power for charging to the battery device 11.

As illustrated in FIG. 5, the management server 17 is composed of a communication circuit 51, a CPU 52, a storage device 53, and a display 54.

The communication circuit 51 communicates with the charging device 14 through a predetermined network according to control of the CPU 52.

The CPU 52 controls operation of each unit of the management server 17. The CPU 52 stores the information supplied from the communication circuit 51 in the storage device 53. The CPU 52 displays the information from the communication circuit 51 or the storage device 53 on the display 54.

The management server 17 is configured as described above and manages the history information transmitted from the charging device 14.

Meanwhile, the communication between the charging device 14 and the management server 17 through the network may be communication in which wireless communication and wired communication are mixed, that is to say, the communication in which the wireless communication is performed in a certain section and the wired communication is performed in another section as well as the wireless communication and the wired communication.

[Flow of Authenticated Charge Process]

Figure 6:
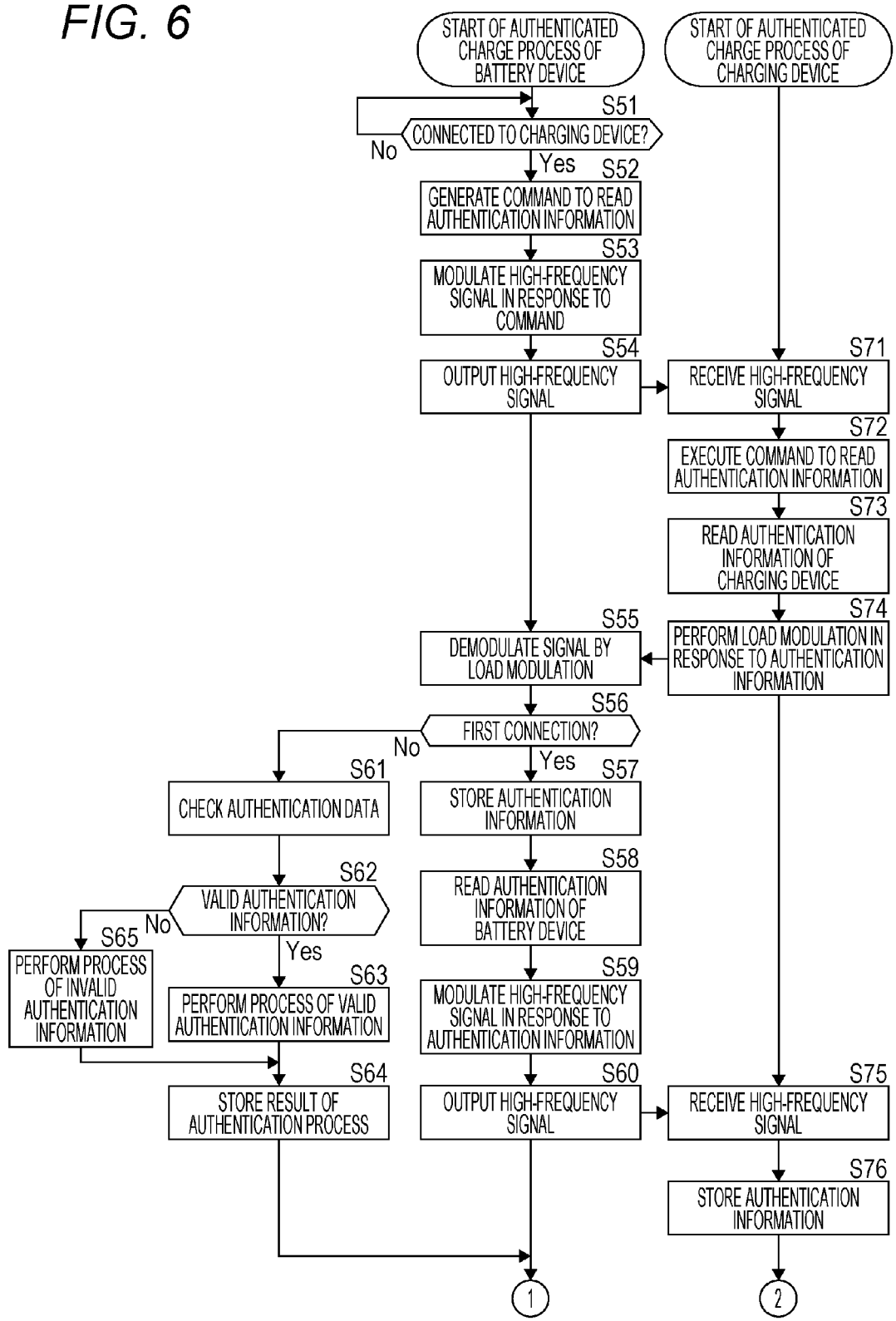
FIG. 6 is a flowchart illustrating an authenticated charge process.
Figure 7:
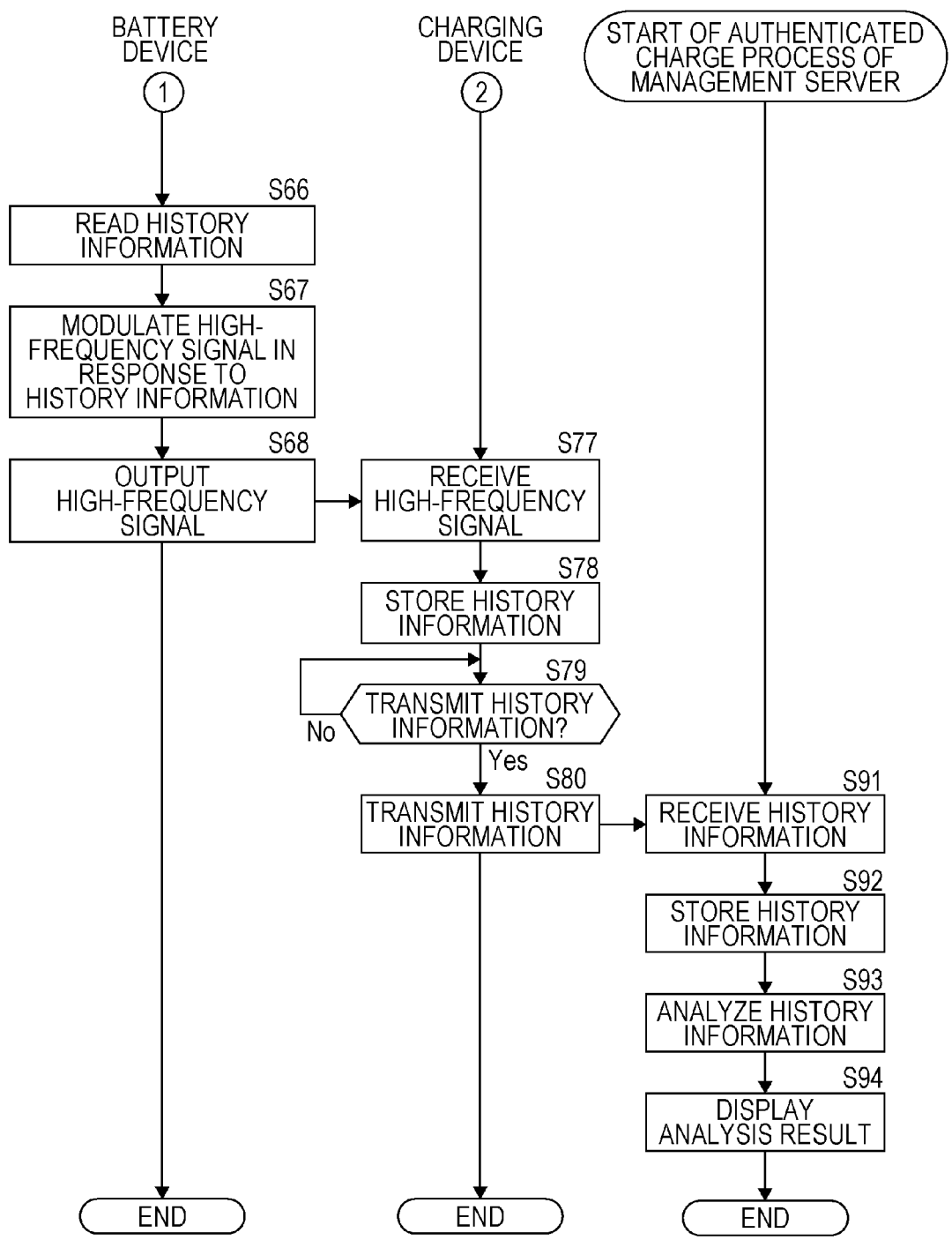
FIG. 7 is a flowchart illustrating the authenticated charge process.

Next, an authenticated charge process performed by the battery device 11, the charging device 14, and the management server 17 is described with reference to flowcharts in FIGS. 6 and 7.

When the battery device 11 is put on the charging device 14 and the battery device 11 and the charging device 14 are electrically connected to each other ("Yes" at step S51), the authenticated charge process is started.

Figure 3:
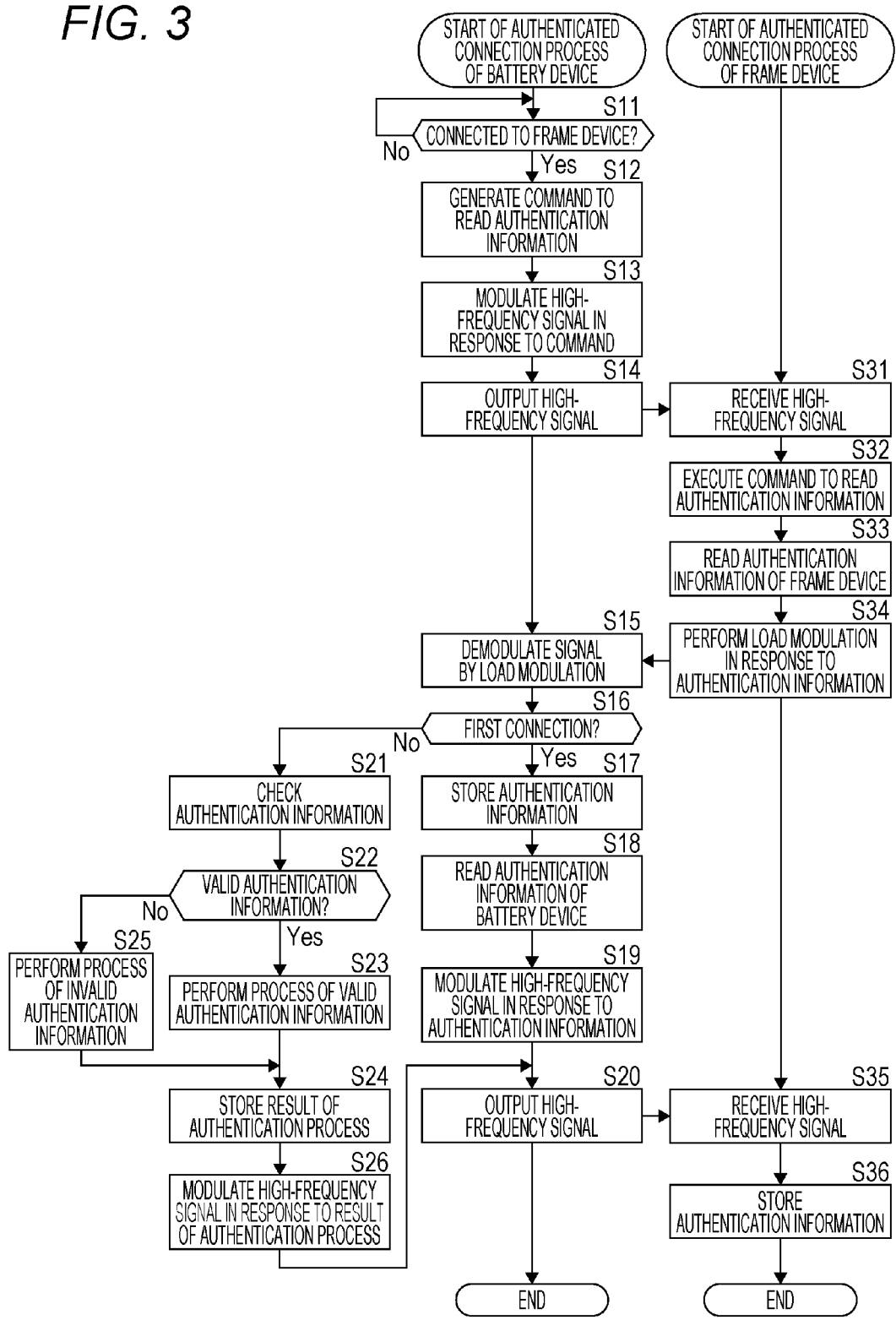
FIG. 3 is a flowchart illustrating an authenticated connection process.

At steps S52 to S54, as at step S12 to S14 in FIG. 3, a microcomputer 25 generates a command to read authentication information and the reader/writer 26 outputs the high-frequency signal corresponding to the command to read the authentication information through the power line.

The high-frequency signal output form the battery device 11 is transmitted to the charging device 14 through the power line. At steps S71 to S74, as at steps S31 to S34 in FIG. 3, the high-frequency signal is received by the IC chip 45, the command to read the authentication information obtained from the received high-frequency signal is executed, and the authentication information of the charging device 14 stored in the memory 45A is read. Then, the IC chip 45 performs the load modulation in response to the authentication information to transmit to the battery device 11 through the power line.

A signal of a reflecting wave generated by the load modulation of the high-frequency signal in the IC chip 45 is received by the battery device 11 through the power line to be demodulated (step S55). By this, the authentication information is read from the charging device 14.

At steps S55 to S65, as at steps S15 to S25 in FIG. 3, when first connection to the charging device 14 is performed, the microcomputer 25 stores the authentication information read from the charging device 14 in the memory 25A. By this, the battery device 11 stores the authentication information of the charging device 14, which should charge the same. In the first connection, the charging circuit 41 generates the DC power to supply to the battery 21, thereby charging the battery 21.

On the other hand, when second or subsequent connection to the charging device 14 is performed, the microcomputer 25 performs an authentication process based on the authentication information read from the charging device 14 and the authentication information stored in the memory 25A in the first connection. For example, when the authentication information is determined to be valid, the microcomputer 25 turns on a switch 22 and the battery 21 is charged with the DC power from the charging circuit 41. On the other hand, when the authentication information is determined to be invalid, the microcomputer 25 turns off the switch 22 and the battery 21 cannot be charged.

That is to say, the battery device 11 can be used only with the frame device 12 properly combined thereto and charged only by the charging device 14 properly combined thereto.

Meanwhile, at step S60, as at step S20 in FIG. 3, the high-frequency signal corresponding to the authentication information is output. In the charging device 14, the high-frequency signal is received and authentication information thereby obtained is stored in the memory 45A at steps S75 and S76 as at steps S35 and S36 in FIG. 3.

Subsequently, at step S66 in FIG. 7, the microcomputer 25 of the battery device 11 reads the history information stored in the memory 25A. The history information includes the information, which may be accumulated by the battery device 11, such as a use status and self-diagnostic information of the power-assisted bicycle 1 obtained by the frame device 12, for example, in addition to the authentication history and the use history of the battery device 11.

At step S67, the reader/writer 26 modulates the high-frequency signal in response to the history information to output through the power line (step S68).

The high-frequency signal output from the battery device 11 is transmitted to the charging device 14 through the power line. In the charging device 14, the IC chip 45 receives the high-frequency signal (step S77) and the history information thereby obtained is stored in the memory 45A (step S78).

At step S79, the microcomputer 47 determines whether to transmit the history information to the management server 17. For example, when it is instructed to transmit the management information by operation of a user, it is determined to transmit the history information ("Yes" at step S79), and the process shifts to step S80.

At step S80, the communication circuit 48 transmits the history information to the management server 17 according to the control of the microcomputer 47.

When the history information is transmitted from the charging device 14, in the management server 17, the communication circuit 51 receives the history information (step S91). Then, at step S92, the CPU 51 stores the received history information in the storage device 53. For example, when it is instructed to analyze the history information by the operation of the user, the CPU 51 applies a predetermined analyzing process to the history information at step S93 and displays an analysis result on the display 54 at step S94.

By this, the authentication information of the frame device 12 on which the battery device 11 is mounted, a result of the authentication process, and the history information such as the use history are managed in block and analyzed by the management server 17, for example, so that it becomes possible to effectively use the history information to take further anti-theft measures.

As described above, in the authenticated charge process, as the authentication process, when the first connection to the charging device 14 is performed by the battery device 11, the authentication information read from the charging device 14 is stored. When the second or subsequent connection to the charging device 14 is performed, the authentication process based on the authentication information read from the charging device 14 and the authentication information stored in the first connection is performed and the battery 21 is controlled according to the result of the authentication process.

That is to say, the battery device 11 stores the authentication information of the charging device 14 on which this is put at the time of first charge after the beginning of use and us charged only with the power of the charging device 14, which holds this authentication information. Therefore, even when the battery device 11 is stolen, for example, the battery device 11 cannot be used with the charging device other than the charging device 14 on which this is put first, so that this cannot be charged unless a valid charging device 14 is used, and once the battery device 11 is discharged, this can never be used again. In general, since the charging device 14 is installed in a place away from the power-assisted bicycle 1 such as user's home, the battery device 11 and the charging device 14 are very unlikely to be stolen at the same time, so that a further anti-theft function may be provided.

In this manner, this technology may provide a highly secure anti-theft function.

For example, when the battery device 11 is locked using the same key as that of a bicycle main body, even if the battery device 11 is stolen by force such as by break of a key hole using a tool, the stolen battery device 11 cannot be used with another power-assisted bicycle, so that theft of the battery device 11 might be avoided. Recently, there is a problem that the stolen battery device comes up for so-called internet auction to be trafficked; such problem may also be solved by adopting the anti-theft function of this technology.

An IC chip 34 of the frame device 12 is operated by the high-frequency signal from the reader/writer 26 of the battery device 11, so that the IC chip 34 and a peripheral circuit do not require power supply at the time of authentication process. That is to say, it is not necessary to separately mount the power supply for the authentication process on the frame device 12 and further the authentication process at a stage at which this is not energized by the battery device 11 becomes possible. By encrypting the communication between the reader/writer 26 of the battery device 11 and the IC chip 34 of the frame device 12, it is possible to prevent unauthorized use by a spoofed valid frame device. Therefore, it becomes possible to realize a secure authentication system by a mechanism easier than conventional one.

Meanwhile, it is also possible to determine whether the combination is proper by storing the authentication information of a valid battery device in the memory 34A of the IC chip 34 of the frame device 12 and checking the same with the authentication information of the battery device 11 currently mounted thereon to perform the authentication process. However, in consideration of the fact that the battery device 11 is a consumable supply and possibility that a plurality of battery devices is used in parallel, it is considered that a system in which the battery device 11 stores the authentication information of the frame device 12 on which this should be mounted and the authentication information of the charging device 14 on which this is put to perform the authentication process is operationally desirable. Being the consumable supply, the battery device 11 should be replaced once a year, for example; since the battery device 11 holds the authentication information, a new battery device 11, which does not hole the authentication information yet, may be immediately mounted on the frame device 12 or charged by the charging device 14 without a preset.

Although the frame device 12 of the power-assisted bicycle 1 and the charging device 14, which charges the battery device 11, are described as electronic devices on which the battery device 11 is mounted in the description above, it is also possible that this is connected to another electronic device having the IC chip through the power line and the above-described authentication process is performed. Also, the battery device may be mounted on an electric vehicle such as an electric automobile, an electric bike, or an electric wheel-chair, for example, in addition to the power-assisted bicycle.

Although the example in which the battery device 11 holds the authentication information of one frame device 12 is described in the above-description, the example is not limited thereto and it is also possible to set to hold the authentication information of a plurality of frame devices 12 and set that a plurality of frame devices 12 holds common authentication information, for example. By this, it becomes possible that a plurality of frame devices 12 shares a plurality of battery devices 11, so that, when a specific business operator manages a plurality of power-assisted bicycles 1 as bicycle rental, for example, it is possible to easily construct a mechanism in which the battery devices 11 may be shared by its own power-assisted bicycles 1, but the battery devices 11 cannot be used with another power-assisted bicycle.

Meanwhile, in this specification, the term "system" is intended to mean an entire device composed of a plurality of devices.

Also, the embodiments of this technology are not limited to the above-described embodiments and various modifications may be made without departing from the scope of this technology.

Further, this technology may have following configurations.

[1]

A battery device, comprising:

a battery, which outputs DC power through a power line;

a communication unit, which, when an electronic device is connected to the battery through the power line, communicates by outputting a high-frequency signal through the power line to read authentication information of the electronic device; and a control unit, which stores the read authentication information and controls the battery when first connection to the electronic device is performed, wherein the control unit performs an authentication process of the electronic device based on the read authentication information and the authentication information stored in the first connection and controls the battery according to a result of the authentication process of the electronic device when second or subsequent connection to the electronic device is performed.

[2]

The battery device according to [1], wherein the electronic device is a power supply device, which supplies the DC power to a drive device for generating electric driving force, in a power-assisted bicycle, which generates auxiliary electric driving force in addition to human driving force to travel forward, and the control unit controls the DC power output from the battery to the power supply device through the power line.

[3]

The battery device according to [1] or [2], wherein the power supply device is provided with a storage element, which outputs the stored authentication information to the battery device through the power line by performing load modulation of the high-frequency signal input through the power line.

[4]

The battery device according to [1], wherein the electronic device is a charging device for charging the battery, and the control unit controls the DC power output from the charging device to the battery through the power line.

[5]

The battery device according to [1] or [4], wherein the charging device is provided with a storage element, which outputs the stored authentication information to the battery device through the power line by performing load modulation of the high-frequency signal input through the power line.

[6]

The battery device according to [1], [4], or [5], further comprising:

a storage unit, which stores history information about authentication history and use history of the battery device, wherein the communication unit communicates by outputting the high-frequency signal through the power line to transmit the stored history information to the charging device.

[7]

A method of controlling a battery device provided with a battery, the method comprising:

communicating by outputting a high-frequency signal through a power line to read authentication information of an electronic device when the electronic device is connected to the battery through the power line;

storing the read authentication information and controlling the battery when first connection to the electronic device is performed; and performing an authentication process of the electronic device based on the read authentication information and the authentication information stored in the first connection to control the battery according to a result of the authentication process of the electronic device when second or subsequent connection to the electronic device is performed.

[8]

An electric vehicle, comprising:

a battery, which output DC power through a power line;

a power supply device, which supplies the DC power to a drive device for generating auxiliary electric driving force in addition to human driving force;

a communication unit, which communicates by outputting a high-frequency signal through the power line to read authentication information of the power supply device when the power supply device is connected to the battery through the power line; and a control unit, which stores the read authentication information and controls the battery when first connection to the power supply device is performed, wherein the control unit performs an authentication process of the power supply device based on the read authentication information and the authentication information stored in the first connection and controls the battery according to a result of the authentication process of the power supply device when second or subsequent connection to the power supply device is performed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 power-assisted bicycle, 2 battery charging system, 11 battery device, 12 frame device, 13 drive device, 13 charging device, 17 management server, 21 battery, 22 switch, 24 contact, 25 microcomputer, 25A memory, 26 reader/writer, 31 contact, 34 IC chip, 34A memory, 43 contact, 45 IC chip, 45A memory

The invention claimed is:

1. A battery device, comprising:
a battery configured to output a DC power through a power line;
a communication unit, in an event an electronic device is connected to the battery through the power line, configured to:
output a high-frequency signal through the power line to the electronic device, and
receive authentication information of the electronic device in response to the high-frequency signal; and
a control unit configured to store the received authentication information and control the battery in an event of a first connection to the electronic device,
wherein the control unit is configured to authenticate the electronic device based on authentication information received in a second or subsequent connection and the authentication information stored in the first connection and control the battery based on a result of the authentication of the electronic device in an event of the second or subsequent connection to the electronic device.

2. The battery device according to claim 1, wherein
the electronic device is a power supply device further configured to supply the DC power to a drive device to generate an auxiliary electric driving force in a power-assisted bicycle, wherein the power-assisted bicycle is configured to generate the auxiliary electric driving force in addition to a human driving force to travel forward, and
the control unit is further configured to control the DC power output from the battery to the power supply device through the power line.

3. The battery device according to claim 2, wherein the power supply device comprises a storage element configured to output the stored authentication information to the battery device through the power line by load modulation of the high-frequency signal input through the power line.

4. The battery device according to claim 1, wherein
the electronic device is a charging device further configured to charge the battery, and
the control unit is further configured to control a DC power output from the charging device to the battery through the power line.

5. The battery device according to claim 4, wherein
the charging device comprises a storage element configured to output the stored authentication information to the battery device through the power line by load modulation of the high-frequency signal input through the power line.

6. The battery device according to claim 4, further comprising:
a storage unit configured to store history information about authentication history and use history of the battery device,
wherein the communication unit is configured to output the high-frequency signal through the power line to transmit the stored history information to the charging device.

7. A method of controlling a battery device, comprising:
in the battery device with a battery:
transmitting a high-frequency signal through a power line to an electronic device in an event the electronic device is connected to the battery device through the power line;
receiving authentication information of the electronic device in response to the high-frequency signal;
storing the received authentication information and controlling the battery in an event the connection is a first connection to the electronic device; and
authenticating the electronic device, in an event the connection is a second or subsequent connection to the electronic device, based on the authentication information stored in the first connection and authentication information received in the second or subsequent connection; and
controlling the battery based on a result of the authentication of the electronic device in an event of the second or subsequent connection to the electronic device.

8. An electric vehicle, comprising:
a battery configured to output DC power through a power line;

a power supply device configured to supply the DC power to a drive device to generate an auxiliary electric driving force in addition to a human driving force;

a communication unit, in an event the power supply device is connected to the battery device through the power line, configured to:
  output a high-frequency signal through the power line to the power supply device, and
  receive authentication information of the power supply device in response to the high-frequency signal; and a control unit configured to store the received authentication information and control the battery in an event of a first connection to the power supply device,
  wherein the control unit is configured to authenticate the power supply device based on authentication information received in a second or subsequent connection and the authentication information stored in the first connection and control the battery based on a result of the authentication of the power supply device in an event of the second or subsequent connection to the power supply device.

* * * * *